US011358356B2

(12) United States Patent
Hassell et al.

(10) Patent No.: US 11,358,356 B2
(45) Date of Patent: Jun. 14, 2022

(54) TRANSFER RING WITH BLOCK AND RAIL SYSTEM

(71) Applicant: Davian Enterprises, LLC, Greenback, TN (US)

(72) Inventors: Stuart J. Hassell, West Midlands (GB); William A. Jones, West Midlands (GB); Robert L. Marcus, Jr., Knoxville, TN (US)

(*) Notice: Subject to any disclaimer, the term of this patent is extended or adjusted under 35 U.S.C. 154(b) by 179 days.

(21) Appl. No.: 16/585,512

(22) Filed: Sep. 27, 2019

(65) Prior Publication Data
US 2020/0101682 A1 Apr. 2, 2020

Related U.S. Application Data

(60) Provisional application No. 62/737,536, filed on Sep. 27, 2018.

(51) Int. Cl.
*B29D 30/00* (2006.01)

(52) U.S. Cl.
CPC .. *B29D 30/0016* (2013.01); *B29D 2030/0022* (2013.01); *B29D 2030/0033* (2013.01)

(58) Field of Classification Search
CPC .. B29D 30/0016; B29D 30/005; B29D 30/54; B29D 30/58; B29D 2030/0022; B29D 2030/0027; B29D 2030/0033; B29D 2030/0038; B29D 2030/241; B29D 2030/2657; B29D 30/26
USPC .............. 156/111, 396, 415, 417, 420, 421.6
See application file for complete search history.

(56) References Cited

U.S. PATENT DOCUMENTS

| 1,233,567 | A | 7/1917 | Furry |
| 1,750,728 | A | 3/1930 | Robison |
| 2,168,897 | A | 8/1939 | Bostwick |
| 2,201,469 | A | 5/1940 | Bostwick |

(Continued)

FOREIGN PATENT DOCUMENTS

| CA | 2188639 | 10/1996 |
| CA | 2219387 | 10/1997 |

(Continued)

OTHER PUBLICATIONS

Yusuke Araki, JP-2013018274-A, machine translation. (Year: 2013).*

(Continued)

*Primary Examiner* — Robert C Dye
*Assistant Examiner* — Sedef E Paquette
(74) *Attorney, Agent, or Firm* — Blanchard & Associates (57) ABSTRACT

A transfer ring for use in the manufacture of vehicle tires, the transfer ring including a radially expandable and collapsible segmented cylindrical gripping surface defined by a plurality of inwardly facing arcuate surfaces mounted for radial movement toward and away from a central axis of the cylindrical gripping surface, wherein each arcuate surface is mounted to a corresponding set of driven linkages comprising first, second, and third members, each set of driven linkages further including a block-and-rail cam follower secured to at least one of the first, second, and third members and configured to cooperate with the first, second, and third members to limit movement of the arcuate surface to linear movement radially toward and away from the central axis of the cylindrical gripping surface.

11 Claims, 6 Drawing Sheets

(56) References Cited

U.S. PATENT DOCUMENTS

| | | |
|---|---|---|
| RE22,369 E | 8/1943 | Bostwick |
| 2,335,169 A | 11/1943 | Bostwick |
| 2,353,767 A | 7/1944 | Schnedarek |
| 2,367,831 A | 1/1945 | Manson |
| 2,529,861 A | 11/1950 | Angell et al. |
| 2,614,057 A | 10/1952 | Ericson et al. |
| 2,699,198 A | 1/1955 | Balzhiser |
| 2,715,932 A | 8/1955 | Frazier |
| 2,728,616 A | 12/1955 | Potter |
| 3,077,918 A | 2/1963 | Noall |
| 3,101,289 A | 8/1963 | Giletta et al. |
| 3,111,444 A | 11/1963 | Pouilloux |
| 3,111,445 A | 11/1963 | Pouilloux et al. |
| 3,140,216 A | 7/1964 | Shilts et al. |
| 3,207,648 A | 9/1965 | Shilts |
| 3,346,434 A | 10/1967 | Fulton |
| 3,366,526 A | 1/1968 | Winslow |
| 3,375,154 A | 3/1968 | Ruttenberg et al. |
| 3,405,023 A | 10/1968 | Eckenwiler et al. |
| 3,408,244 A | 10/1968 | Frazier |
| 3,485,700 A | 12/1969 | Cooper et al. |
| 3,489,634 A | 1/1970 | Pizzo et al. |
| 3,507,528 A | 4/1970 | Desmarchais |
| 3,547,733 A | 12/1970 | Leblond |
| 3,598,673 A | 8/1971 | Caretta |
| 3,644,162 A | 2/1972 | Appleby et al. |
| 3,676,261 A | 7/1972 | Appleby et al. |
| 3,694,290 A | 9/1972 | Pacciarini et al. |
| 3,695,974 A | 10/1972 | Henley |
| 3,784,426 A | 1/1974 | Woodhall et al. |
| 3,787,262 A | 1/1974 | Appleby et al. |
| 3,816,218 A | 6/1974 | Felten |
| 3,833,444 A | 9/1974 | Mallory |
| 3,837,968 A | 9/1974 | Marra |
| 3,867,229 A | 2/1975 | Marra |
| 3,873,398 A | 3/1975 | Yokoo et al. |
| 3,887,423 A | 6/1975 | Gazuit |
| 3,929,546 A | 12/1975 | Katagiri et al. |
| 3,948,717 A | 4/1976 | Suzuki et al. |
| 4,010,058 A | 3/1977 | Kubinski et al. |
| 4,105,487 A | 8/1978 | Suzuki et al. |
| 4,126,507 A | 11/1978 | Kim et al. |
| 4,128,450 A | 12/1978 | Cantarutti |
| 4,131,500 A | 12/1978 | Wilde et al. |
| 4,149,927 A | 4/1979 | Lauer, Jr. |
| 4,151,035 A | 4/1979 | Jellison |
| 4,155,796 A | 5/1979 | Rambacher |
| 4,190,482 A | 2/1980 | Yabe |
| 4,210,482 A | 7/1980 | Collins |
| 4,220,494 A | 9/1980 | Kawaida et al. |
| 4,230,517 A | 10/1980 | Enders |
| 4,239,579 A | 12/1980 | Felten et al. |
| 4,292,112 A | 9/1981 | Kumagai |
| 4,312,696 A | 1/1982 | Bryant |
| 4,324,604 A | 4/1982 | Alexander et al. |
| 4,325,764 A | 4/1982 | Abbleby et al. |
| 4,392,899 A | 7/1983 | Bertoldo |
| 4,425,180 A | 1/1984 | Samokhvalov et al. |
| 4,436,574 A | 3/1984 | Long et al. |
| 4,445,962 A | 5/1984 | Felder |
| 4,469,546 A | 9/1984 | Klose et al. |
| 4,472,233 A | 9/1984 | Fukamachi et al. |
| 4,473,427 A | 9/1984 | Irie |
| 4,510,012 A | 4/1985 | Kawaida et al. |
| 4,519,279 A | 5/1985 | Ruggeri |
| 4,521,269 A | 6/1985 | Ozawa |
| 4,582,557 A | 4/1986 | Enders |
| 4,626,302 A | 12/1986 | Casey et al. |
| 4,636,277 A | 1/1987 | Owen et al. |
| 4,729,541 A | 3/1988 | Maier |
| 4,780,171 A | 10/1988 | Byerley |
| 4,798,647 A | 1/1989 | Haas |
| 4,861,123 A | 8/1989 | Russell |
| 4,861,173 A | 8/1989 | Kemp |
| 5,047,108 A | 9/1991 | Byerley |
| 5,066,354 A | 11/1991 | Benjamin |
| 5,071,498 A | 12/1991 | Nishiide et al. |
| 5,078,819 A | 1/1992 | Sergei et al. |
| 5,089,077 A | 2/1992 | Byerley |
| 5,203,947 A | 4/1993 | Boeker |
| 5,223,074 A | 6/1993 | Miyanaga et al. |
| 5,225,028 A | 7/1993 | Bierens |
| 5,232,542 A | 8/1993 | Norjiri et al. |
| 5,264,068 A | 11/1993 | Masuda |
| 5,320,701 A | 6/1994 | Jellison et al. |
| 5,354,405 A | 10/1994 | Byerley |
| 5,380,384 A | 1/1995 | Tokunaga et al. |
| 5,441,587 A | 8/1995 | Byerley |
| 5,500,074 A | 3/1996 | Suzuki |
| 5,505,803 A | 4/1996 | Byerley |
| 5,558,733 A | 9/1996 | Byerley |
| 5,618,374 A | 4/1997 | Byerley |
| 5,635,016 A | 6/1997 | Byerley |
| 5,650,034 A | 7/1997 | Siegenthaler |
| 5,709,768 A | 1/1998 | Byerley |
| 5,735,995 A | 4/1998 | Bull et al. |
| 5,755,922 A | 5/1998 | Baldoni et al. |
| 5,766,408 A | 6/1998 | Ogawa |
| 6,004,250 A | 12/1999 | Byerley |
| 6,007,268 A | 12/1999 | Whittington et al. |
| 6,013,147 A | 1/2000 | Byerley |
| 6,058,999 A | 5/2000 | Roberts et al. |
| 6,117,269 A | 9/2000 | Pizzorno |
| 6,152,645 A | 11/2000 | Sanford |
| 6,238,292 B1 | 5/2001 | Pelkey |
| 6,336,485 B1 | 1/2002 | Kaneko et al. |
| 6,390,166 B1 | 5/2002 | Roberts et al. |
| 6,457,505 B1 | 10/2002 | Byerley |
| 6,475,319 B1 | 11/2002 | Akiyama |
| 6,539,998 B2 | 4/2003 | Sergel et al. |
| 6,571,682 B2 | 6/2003 | Roberts et al. |
| 6,585,022 B1 | 7/2003 | Rex |
| 6,602,372 B1 | 8/2003 | Byerley |
| 6,673,183 B2 | 1/2004 | Byerley |
| 6,793,752 B2 | 9/2004 | Lemaire et al. |
| 7,000,905 B1 | 2/2006 | Lutter et al. |
| 7,287,772 B2 | 10/2007 | James |
| 7,288,160 B2 | 10/2007 | Roedseth et al. |
| 7,370,897 B2 | 5/2008 | Fukazawa |
| 7,637,665 B2 | 12/2009 | Cook |
| 7,699,952 B2 | 4/2010 | Linne et al. |
| 7,837,816 B2 | 11/2010 | Liinne et al. |
| 8,056,597 B2 | 11/2011 | Byerley |
| 8,091,602 B2 | 1/2012 | Roberts et al. |
| 8,272,417 B2 | 9/2012 | Painter |
| 8,555,944 B2 | 10/2013 | Painter |
| 8,602,078 B2 | 12/2013 | Byerley |
| 8,701,731 B2 | 4/2014 | Roberts et al. |
| 9,427,925 B2 | 8/2016 | Araki |
| 10,189,221 B2 | 1/2019 | Jones et al. |
| 2003/0197389 A1 | 10/2003 | Moilanen et al. |
| 2004/0239134 A1 | 12/2004 | Fukazawa |
| 2008/0202690 A1 | 8/2008 | Painter |
| 2010/0000658 A1 | 1/2010 | Roberts et al. |
| 2010/0101732 A1 | 4/2010 | Howley et al. |
| 2010/0186864 A1 | 7/2010 | Koopman et al. |
| 2011/0303366 A1 | 12/2011 | Byerley |
| 2012/0017720 A1 | 1/2012 | Painter |
| 2012/0033906 A1 | 2/2012 | Painter |
| 2012/0090787 A1 | 4/2012 | Jones et al. |
| 2012/0168087 A1 | 7/2012 | Byerley |
| 2012/0222822 A1 | 9/2012 | Jones et al. |
| 2012/0256434 A1 | 10/2012 | Roberts et al. |
| 2013/0008611 A1 | 1/2013 | Marcus et al. |
| 2014/0213330 A1 | 8/2014 | Jones et al. |
| 2015/0028147 A1 | 1/2015 | Rich |
| 2015/0239190 A1 | 8/2015 | Currie et al. |

FOREIGN PATENT DOCUMENTS

| | | |
|---|---|---|
| CA | 2142004 | 4/2006 |
| DE | 19913241 | 9/2000 |
| DE | 102009025759 | 11/2010 |
| EP | 1688240 | 11/2004 |

(56) References Cited

FOREIGN PATENT DOCUMENTS

| | | | |
|---|---|---|---|
| EP | 1621327 | 6/2005 | |
| GB | 2323573 | 9/1998 | |
| JP | 58179633 A * | 10/1983 | ......... B29D 30/0016 |
| JP | 2008-221750 | 3/2007 | |
| JP | 2011-255768 | 12/2011 | |
| JP | 2013018274 A * | 1/2013 | |
| JP | 5562470 B1 * | 7/2014 | |
| MX | 200554 | 1/2001 | |
| NL | 9401271 | 3/1995 | |
| WO | WO2001/007242 | 2/2001 | |
| WO | WO2006/003058 | 1/2006 | |
| WO | WO2008/025598 | 3/2008 | |
| WO | WO2010/052103 | 5/2010 | |
| WO | WO2011/159343 | 12/2011 | |
| WO | WO2012/021160 | 2/2012 | |
| WO | WO2012/031193 | 3/2012 | |

OTHER PUBLICATIONS

Yasuhiko Fujieda, JP-58179633-A, machine translation. (Year: 1983).*
Yoshida, JP-5562470-B1, machine translation. (Year: 2014).*
Patent Cooperation Treaty, Int'l Search Report & Written Opinion, Form PCT/ISA/220 (Revised Jan. 2019).

* cited by examiner

TRANSFER RING WITH BLOCK AND RAIL SYSTEM

CROSS-REFERENCE TO RELATED APPLICATIONS

This application claims the benefit of U.S. Provisional Patent Application Ser. No. 62/737,536, filed on Sep. 27, 2018, which is incorporated herein in its entirety by reference.

FIELD OF INVENTION

The present general inventive concept relates to devices that are useful in the manufacture of vehicle tires. More particularly, the present general inventive concept relates to an improved transfer ring useful in the manufacture of vehicle tires.

BACKGROUND

The manufacture of a vehicle tire commonly includes the steps of forming a tire carcass, forming a toroid-shaped belt and tread "package" of the tire separately from the carcass, and thereafter marrying the belt and tread package to the tire carcass to form a "green" tire. The green tire is thereafter treated to form the tread and various other features of a finished tire. Other supplementary steps, such as bonding the belt and tread package to the tire carcass (often referred to as "stitching" the belt and tread package), may be performed during the course of, or following, one or more of the aforementioned steps.

Formation of a belt and tread package of a tire is typically accomplished using a belt and tread drum, of the type disclosed in U.S. Pat. No. 6,013,147. Such a belt and tread drum typically has an outer cylindrical surface, or circumference, about which one or more layers of the tire belt material (comprising, for example, reinforcement cords embedded in a polymeric binder) are laid to define the belt and tread package. The circumference of the belt and tread drum is preferably capable of expanding and contracting to allow, for example, removal of a completed belt and tread package from the drum. A completed belt and tread package is typically essentially nonexpandable radially. However, a completed belt and tread package is typically flexible to the extent that, when unsupported, the toroid-shaped belt and tread package will deform and sag under the influence of gravity. Also, desirably, the adjustable circumference of the belt and tread drum enables a single drum to be used to form belt and tread packages of alternative diameters.

In the manufacture of vehicle tires, a tire carcass is typically fabricated using a tire building drum, of the type described in U.S. Pat. No. 6,457,505. Such a tire building drum typically defines a radially expandable and contractible cylindrical working surface, similar to the above-discussed belt and tread drum, upon which a tire carcass is formed. Subsequent to the formation of the tire carcass on the cylindrical working surface, such tire carcass typically is transferred to an expansion drum, of the type discussed in U.S. Pat. No. 6,602,372. The tire carcass is positioned surrounding the expansion drum, and a portion of the tire carcass is overlaid with the belt and tread package. The tire carcass is then inflated to a toroid shape resembling, though often not identical to, the shape of a finished tire. While the tire carcass is inflated, the belt and tread package is stitched to the tire carcass.

In the above-described process, the steps of transferring a tire carcass from a tire building drum to an expansion drum and transferring a belt and tread package to a tire carcass for stitching are typically both accomplished using one or more transfer rings, of the type described in U.S. Pat. No. 8,091,602. Such a transfer ring typically includes a plurality of "shoe" segments having arced interior surfaces which collectively form a segmented, radially-inwardly-facing cylindrical surface suitable for grasping and holding a tire carcass and/or a belt and tread package. Each shoe segment is mounted on an appropriate linkage such that the shoes are collectively radially expandable and contractible with respect to one another, such that the diameter of the segmented, radially-inwardly-facing cylindrical surface can be expanded to fit over a tire carcass and/or belt and tread package, contracted to grasp the tire carcass or belt and tread package for transfer, and then re-expanded to release the tire carcass or belt and tread package following transfer.

When a transfer ring is used as described above to transfer a tire carcass and/or belt and tread package (hereinafter, collectively, "tire component"), it is not uncommon for the shoes and associated linkages of the transfer ring to be configured such that, as the transfer ring is contracted to bring the shoes radially inward around the tire component to grip the tire component, the linkages move each of the shoes along an arced path both radially inwardly and circumferentially around the central axis of the transfer ring. This type of motion is sometimes referred to as an "iris" motion pattern. In certain prior art transfer rings employing an iris motion pattern of the shoes, movement of the shoes both radially inwardly and circumferentially around the central axis of the transfer ring can, in some instances, result in the shoes imparting "twisting" forces to the tire component in a direction along a circumference of the tire component. These "twisting" forces can, in certain instances, be undesirable, and in some instances, can hinder efforts in maintaining structural integrity and a uniform shape of the tire component during transfer.

In light of the above, it would be desirable to transfer tire components with a tire transfer ring which allows expansion and contraction of the shoes in a radial direction while inhibiting circumferential travel, and which maintains the alignment and stability of the shoes in the aforementioned segmented cylindrical shape in relation to one another.

BRIEF SUMMARY

According to various example embodiments of the present general inventive concept, a transfer ring is provided that is equipped with a plurality of shoes arranged in a substantially circular configuration to define an inwardly-facing segmented cylindrical gripping surface, wherein each of the shoes is actuated by a plurality of linkages that allow for movement of the shoe in a linear direction radially inwardly and outwardly in relation to a central axis of the segmented cylindrical gripping surface.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by providing a transfer ring to use in the manufacture of vehicle tires, the transfer ring including a circular frame, a plurality of driven linkages coupled to the circular frame and configured to be movable between a contracted position and an expanded position, a drive member disposed along the circular frame, the drive member being coupled to the driven linkages and configured to drive the driven linkages between the contracted position and the expanded position, and a plurality of shoes having arcuate interior surfaces facing substantially radially inwardly toward a central axis to collectively define a substantially cylindrical segmented gripping surface, each of the shoes being coupled to at least one of the driven linkages so as to be selectively move toward and away from the central axis, wherein each of the driven linkages includes a first member coupled to the circular frame, a second member coupled to the drive member and the first member, a third member coupled to a corresponding one of the shoes and to the first member, and a block-and-rail cam follower configured such that a rail portion is fixed to the circular frame, and a block portion is coupled to the third member, wherein the driven linkages are configured to limit movement of the arcuate surface to linear movement radially toward and away from the central axis.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

According to various example embodiments of the present general inventive concept, a transfer ring is provided that is equipped with a plurality of shoes arranged in a substantially circular configuration to define an inwardly-facing segmented cylindrical gripping surface, wherein each of the shoes is actuated by a plurality of linkages that allow for movement of the shoe in a linear direction radially inwardly and outwardly in relation to a central axis of the segmented cylindrical gripping surface. In various example embodiments the inward and outward movement of the shoes is guided by driven linkage sets including a block-and-rail cam follower that limits the movement of the shoes to radial movement relative to the central axis, inhibiting any circumferential travel about the central axis by the shoe.

Figure 1:
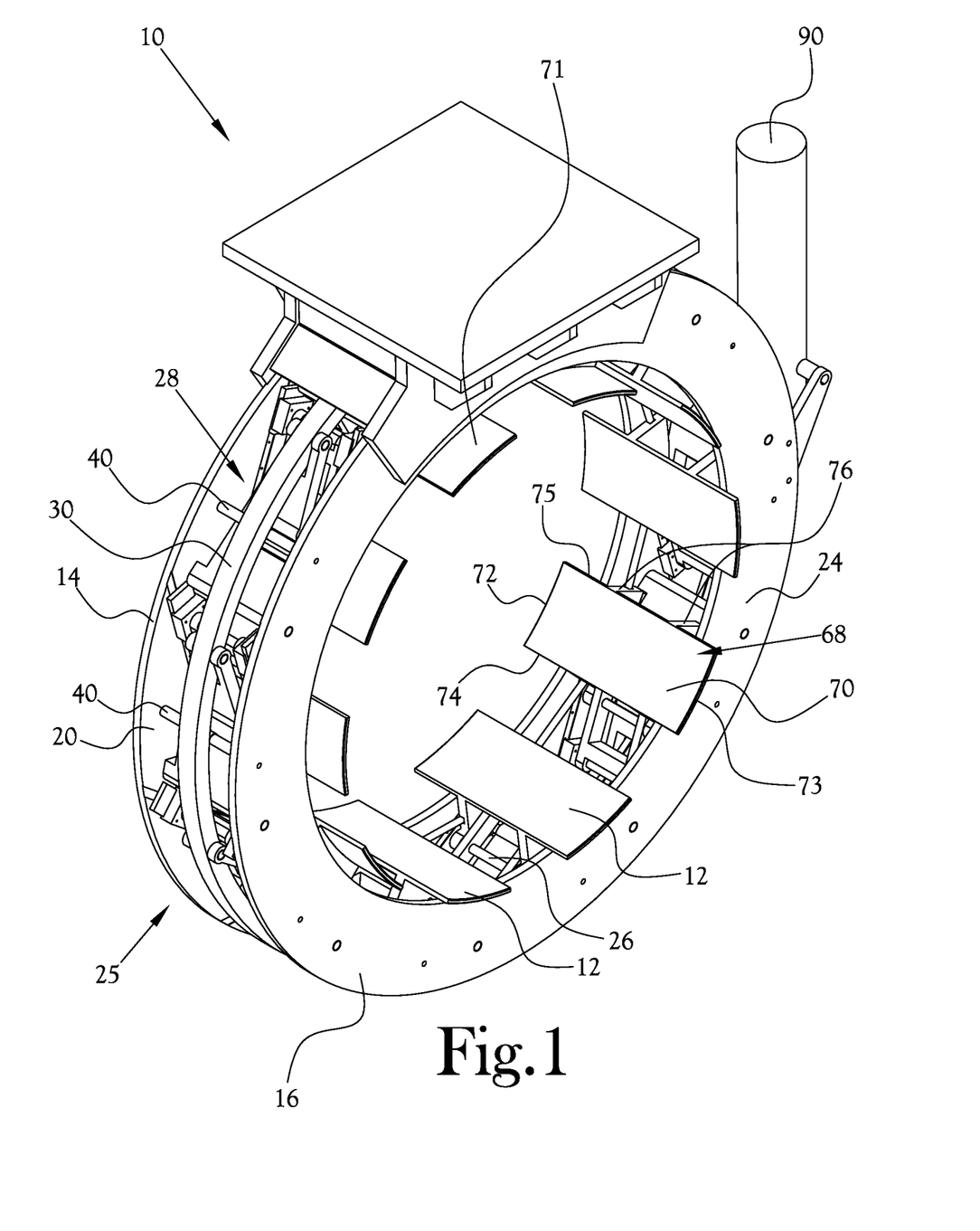
FIG. 1 illustrates a perspective view of a transfer ring in an expanded position according to an example embodiment of the present general inventive concept.
Figure 2:
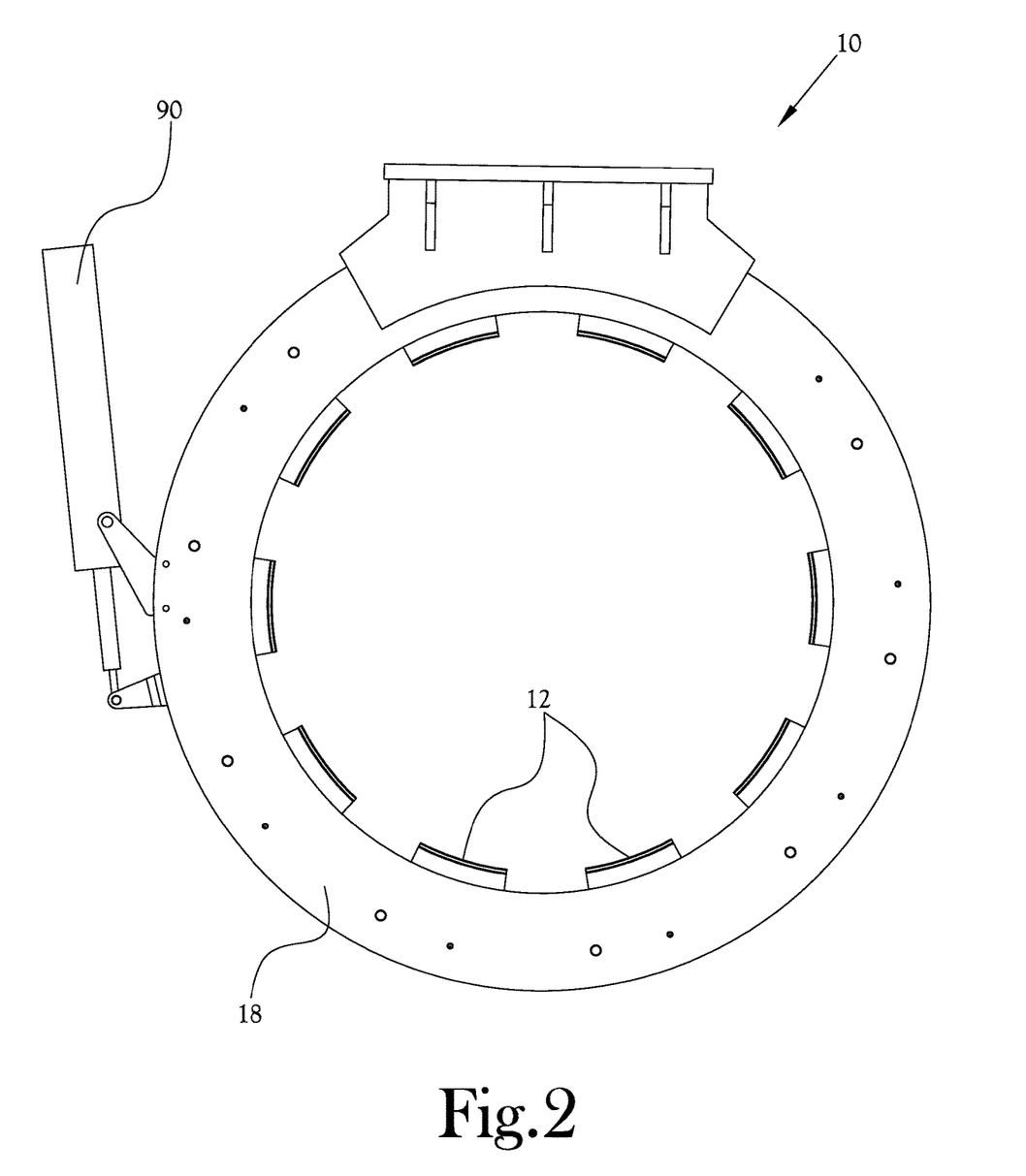
FIG. 2 illustrates a front view of the transfer ring of FIG. 1 in the expanded position.

FIG. 1 illustrates a perspective view of a transfer ring in an expanded position according to an example embodiment of the present general inventive concept, and FIG. 2 illustrates a front view of the transfer ring of FIG. 1 in the expanded position. In this example embodiment the transfer ring 10 includes a plurality of shoes 12 that are movable from an expanded to a contracted position, and vice versa, to grip an outer surface of a desired tire component for transfer to another location and/or device. It is understood that various example embodiments of the present general inventive concept may include more or fewer components than those illustrated in these figures, and/or of different configurations, without departing from the scope of the present general inventive concept. Also, some components may be omitted from these figures and descriptions for the sake of clarity. The transfer ring 10 includes first and second circular frame members 14,16 disposed in a fixed, registered, side-by-side, parallel, and space apart relationship to one another. The first and second circular frame members 14,16 may be configured with substantially the same inner and outer diameters, and each may have a generally rectangular cross-section having respective inner and outer opposite flat side surfaces 18,20 and 22,24, respectively. A plurality of hinge pin connectors 26 extend between the first and second circular frame members 14,16 at spaced apart locations about the respective perimetral margins of the first and second circular frame members 14,16 to rigidly retain the side-by-side, parallel, registered, and spaced apart relationship of the first and second circular frame members 14,16, thereby defining a skeletal cage 25 having an open space 28 between the first and second circular frame members 14,16.

Within the open space 28 of the skeletal cage 25, there is disposed a circular drive member 30 mounted in side-by-side, parallel, and coaxial relationship to the first and second circular frame members 14,16, via a plurality of rollers 40 extending between the first and second circular frame members 14,16, such that the drive member 30 is disposed between the first and second circular frame member 14,16 and rotatable about a central axis of the drive member 30 with respect to the skeletal cage 25. The components and mechanisms between the first and second circular frame members 14,16 may be more easily seen in FIG. 3, which illustrates a front view of the transfer ring 10 as depicted in FIG. 2 without the front, or first, frame member 14. A plurality of sets of driven linkages 41 are provided within the open space 28 of the skeletal cage 25. Each of the driven linkage sets 41 includes a first member 42 configured with an elongated geometry, and having a first end 43 which is pivotably coupled to a respective hinge pin connector 26 extending between the first and second circular frame members 14,16, and a second end 44 which extends generally inwardly of the skeletal cage 25. Each of the driven linkage sets 41 also includes a second member 45 configured with an elongated geometry, and having a first end 46 which is pivotably coupled to a portion of the circular drive member 30, and a second end 47 which is pivotably coupled to a portion of a corresponding first member 42, between the first end 43 and the second end 44 of the first member 42. Each of the driven linkage sets 41 also includes a third member 48 configured with an elongated geometry, and having a first end 49 which is pivotably coupled to a block portion 60 of a block-and-rail cam follower, and a second end 50 which is pivotably coupled to a corresponding shoe 12. Each second end 44 of each first member 42 is pivotably coupled to the third member 48 proximate a central portion of the third member 48. Each block portion 60 is configured to slidably follow a rail portion 62 of the block-and-rail cam follower, for example via an appropriate tongue-and-groove fitting, rollers, or the like. In the illustrated embodiments, each respective rail portion 62 of the block-and-rail cam follower is mounted along a portion of the inner surfaces 20,22 of the first and second frame members 14,16. In various example embodiments, grooves may be formed in the inner surfaces 20,22 of the first and second frame members 14,16 to receive the respective rail portions 62 of the block-and-rail cam followers, so as to provide a more secure fitting.

Figure 3:
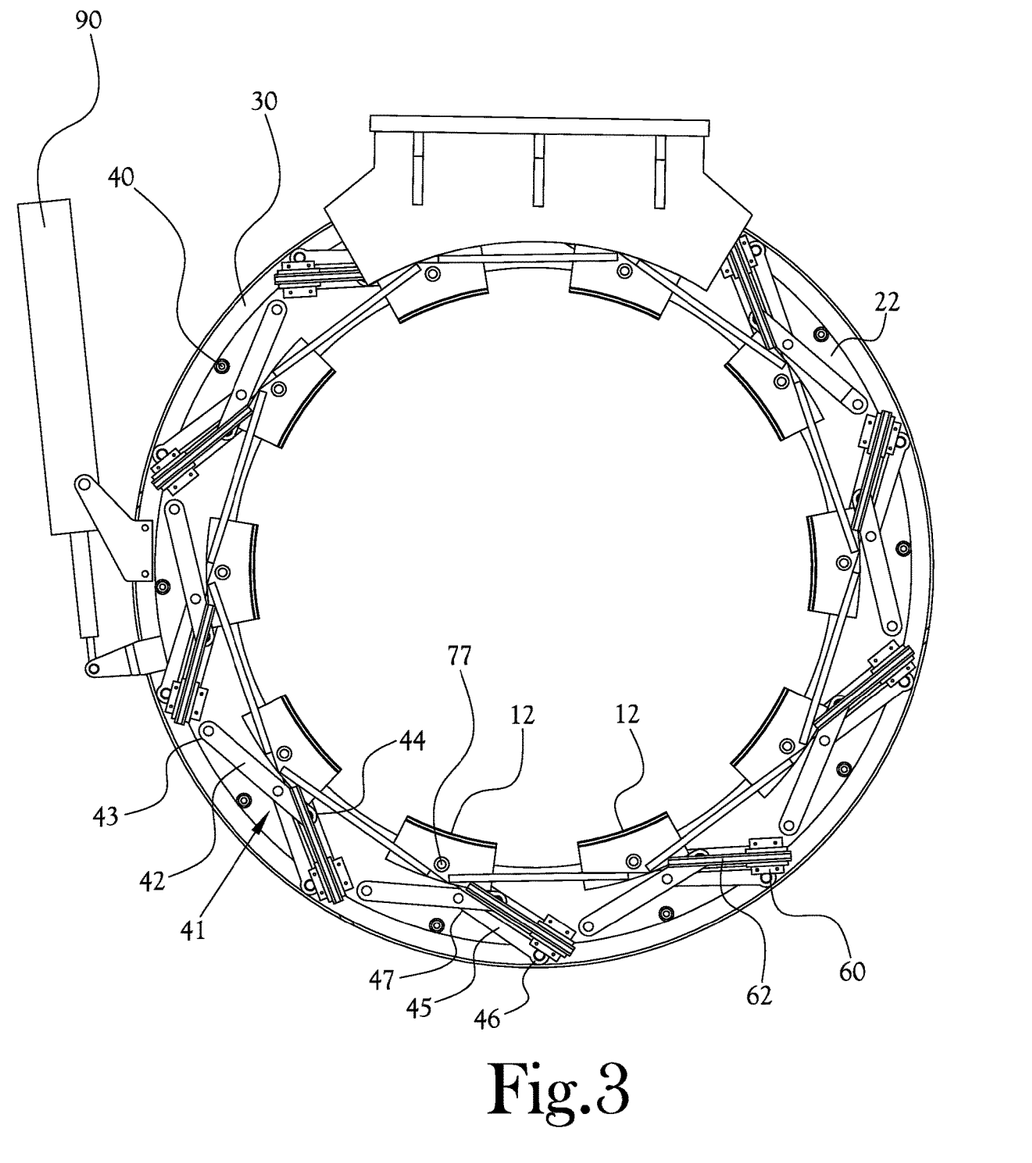
FIG. 3 illustrates a front view of the transfer ring as depicted in FIG. 2 without the front frame member.

As previously described, a plurality of articulating shoes 12 are provided, with each shoe 12 being pivotably coupled to a corresponding second end 50 of the third member 48 of the driven linkage sets 41 along a dimension parallel to the central axis of the skeletal cage 25. Each shoe 12 includes a plate 68 having an arcuate interior surface 70 facing substantially radially inwardly of the skeletal cage 25 and an outer surface 71 facing substantially radially outwardly of the skeletal cage 25. Each plate 68 defines first and second arcuate side edges 72,73, respectively, as well as first and second end edges 74,75, respectively, which extend at opposite ends of the arcuate plate 68 between the first and second side edges 72,73. The various shoes 12 are arranged in an end-to-end configuration with each first end edge 74 of each plate 68 extending generally along a second end edge 75 of an adjacent plate 68, such that the various arcuate interior surfaces 70 of the plates 68 of the shoes 12 cooperate to collectively establish a segmented cylindrical surface which, as will be further discussed below, is adapted to surround and grasp an object, such as, for example, a tire component.

Each shoe further includes at least one wall 76 extending outwardly from the plate 68 generally perpendicular to the outer surface 71. In the illustrated embodiment, a pair of walls 76 extend outwardly from the plate 68 at a parallel, spaced apart orientation to one another along an arcuate dimension of the plate 68. The walls 76 are spaced apart from one another a suitable distance to allow the second end 50 of the third member 48 of a corresponding one of the driven linkage sets 41 to be inserted therebetween, so as to be pivotably coupled to the inner surface of at least one of the walls 76. Suitable fastening means, such as, for example, a plurality of axially-aligned through openings 77, may be provided along the walls 76 and through each corresponding third member 48 second end 50 to allow receipt therein of a pin, bolt, or other such rotatable connector, so as to allow each shoe 12 to be pivotably connected to the corresponding third member 48 second end 50. In the illustrated embodiment, an internally-threaded set screw opening is provided opening perpendicular to an axial dimension of one of the through openings 77, such that upon receipt of a pin connector through the through openings 77 in the walls 76 and the third member 48 second end 50, a set screw (not shown) may be received within the set screw opening to secure the pin connector through the through openings 77. However, it will be understood that other suitable configurations exist which may be used to achieve a rotatable connection between each shoe 12 and a corresponding driven third member 48 second end 50, and such other configurations may be used without departing from the spirit and scope of the present general inventive concept.

First and second grooves 78,79 may be defined along each wall 76 of each shoe 12, with each first groove 78 having at least one open end which opens toward an adjacent shoe 12, and with each second groove 79 having at least one open end which opens toward an opposite adjacent shoe 12. The first groove 78 is adapted to receive therein a first end 81 of a rigid guide rod 80 of sufficient length to span two adjacent ones of the shoes 12. The first end 81 of each guide rod 80 is anchored within its respective first groove 78 by a suitable fastener, such as for example a screw, bolt, weld, adhesive, or other fastener, or by an integral connection. An opposite second end 82 of each guide rod 80 extends into and is slidably received within the second groove 79 of an adjacent shoe 12.

Figure 4:
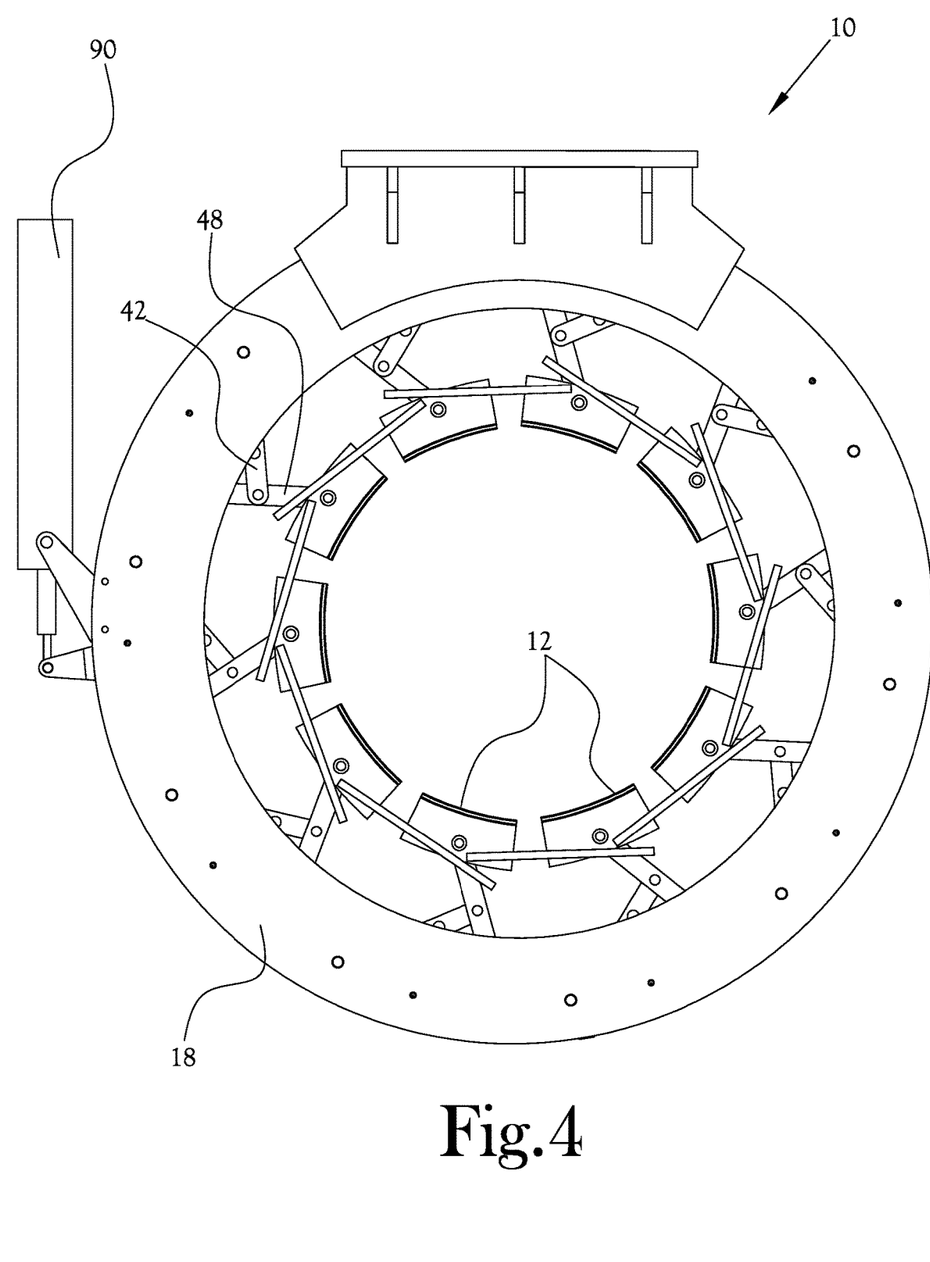
FIG. 4 illustrates a front view of the transfer ring of FIG. 1 in a contracted position.
Figure 5:
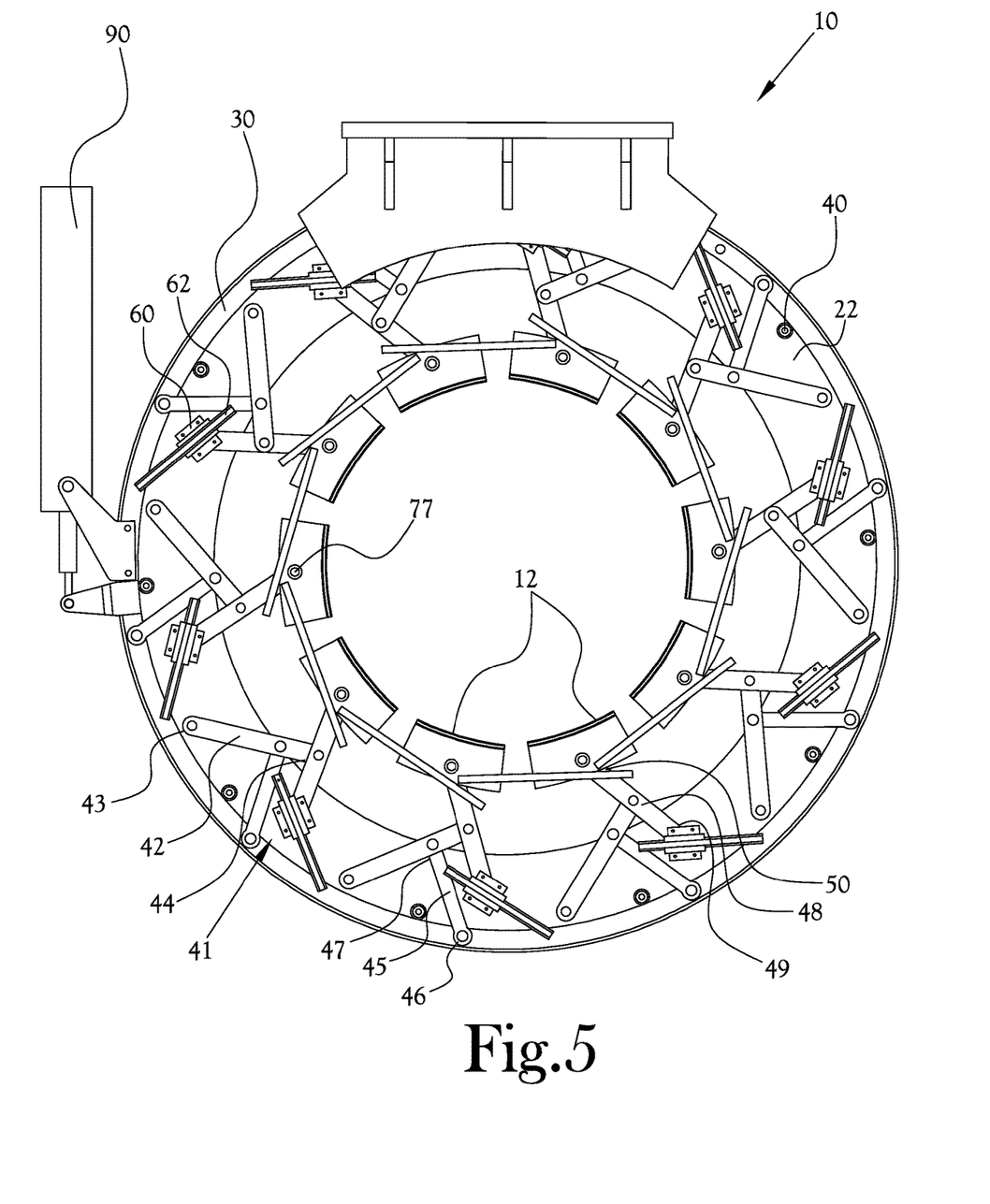
FIG. 5 illustrates a front view of the transfer ring as depicted in FIG. 4 without the front frame member.

A power source 90, such as a piston/cylinder device, may be provided for effecting controlled rotation of the circular drive member 30 in relation to the skeletal cage 25. Thus, actuation of the power source 90 results in rotational movement of the circular drive member 30 in relation to the skeletal cage 25, which in turn rotates each driven linkage set 41 about its respective hinge connectors 26 between a contracted position, in which each second end 44 of each first member 42 of the respective driven linkage sets 41 is moved inwardly and thus causes the second end 50 of the third member 48 to move the corresponding shoe 12 inwardly toward the central axis of the circular drive member 30 and the first and second circular frame members 14,16, and an expanded position in which the driven linkage sets 41 are collapsed to bring the corresponding shoes 12 outwardly from the central axis of the circular drive member 30 and the first and second circular frame members 14,16. FIG. 4 illustrates a front view of the transfer ring of FIG. 1 in a contracted position, and FIG. 5 illustrates a front view of the transfer ring as depicted in FIG. 4 without the front frame member. Due to the linear movement action of the block-and-rail cam follower 60,62 controlling the first end 49 of the third member 48, which is linked to the first member 42, and to the second member 45 through the connection with the first member 42, the arcuate interior surface 70 of the shoe 12 moves toward the central axis of the circular drive member 30 and the first and second circular frame members 14,16 without circumferential movement about that central axis.

Figures 6A, 6B, 6C:
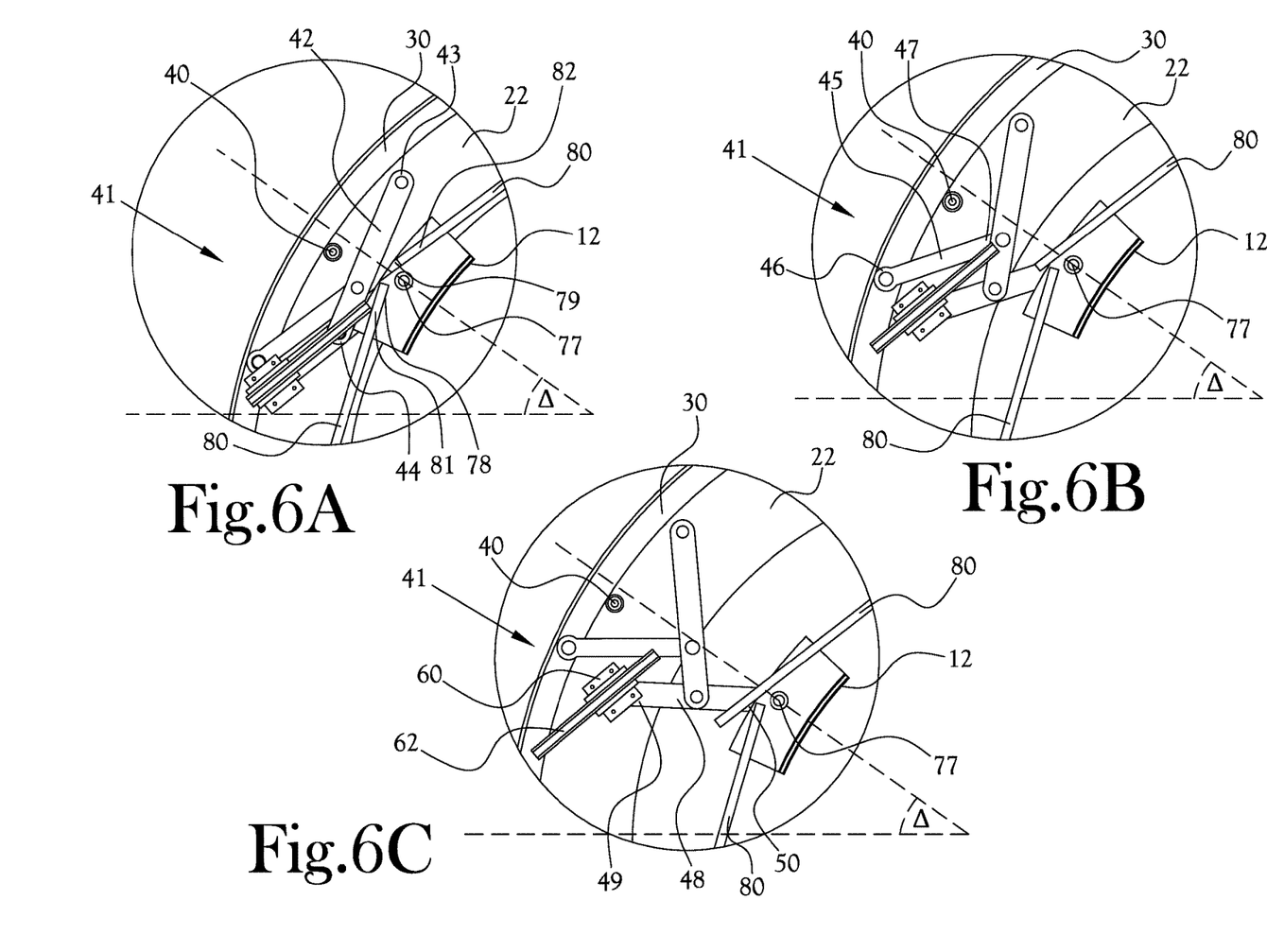
FIGS. 6A-C illustrate different positions of a transfer ring shoe according to an example embodiment of the present general inventive concept as the shoe moves from the expanded position to the contracted position.

FIGS. 6A-C illustrate different positions of a transfer ring shoe according to an example embodiment of the present general inventive concept as the shoe moves from the expanded position to the contracted position. FIG. 6A illustrates one of the shoes 12 in a fully expanded position, FIG. 6B illustrates the shoe 12 being moved toward the central axis as the circular drive member 30 is rotated relative to the first and second frame members 14,16, and FIG. 6C illustrates the shoe 12 moved to the fully contracted position. As the first end 43 of the first member 42 is pivotably coupled to the inner flat surface 18 of the first frame member 14 (which has been omitted from this drawing for clarity), and the first end 46 of the second member 45 is pivotably coupled to the circular drive member 30, when the circular drive member is rotated (in a clockwise fashion in the views of FIGS. 6A-C) the first ends 43,46 of the first and second members 42,45 are brought in closer to proximity to one another. This forces the pivotable coupling of the second end 47 of the second member and the first member 42 to move generally inward toward the central axis, which in turn causes the second end 50 of the third member 48 to also move generally inward toward the central axis. This movement is guided by the sliding of the block portion 60 along the rail portion 62 of the block-and-rail cam follower, the rail portion 62 being fixed to the inner flat surface 18 of the first frame member 14 (again, removed for this drawing), to move the shoe 12 inwardly and directly toward the central axis of the circular drive member 30 and the first and second frame members 14,16. As illustrated, the angle Δ remains relatively constant, as circumferential movement of the shoe 12 is inhibited by the driven linkage set 41 with the block-and-rail cam follower 60,62. Thus, the driven linkages 41 are configured to rotate between the expanded position and the collapsed position upon appropriate rotation of the circular drive member 30 in relation to the skeletal cage. Thus, upon rotation of the circular drive member 30 to the expanded position, the shoes 12 are carried by the second ends 50 of the third members 48 radially outwardly from a central axis of the transfer ring 10 to an expanded configuration, wherein the interior surfaces 70 of the shoes 12 are separated from one another to increase the overall diameter of the segmented cylindrical surface used to grip the tire component. Conversely, upon rotation of the circular drive member 30 to the contracted position, the shoes 12 are carried by the second ends 50 of the third members 48 radially inwardly toward a central axis of the transfer ring 10 to a contracted configuration, wherein the interior surfaces 70 of the shoes 12 are brought closer to one another to decrease the overall diameter of the segmented cylindrical surface. To this end, each of the first and second grooves 78,79 is oriented with respect to one another such that each of the guide rods 80 slide along its respective second groove 56 to cooperatively maintain the interior surfaces 70 of the shoes 12 with respect to one another in a generally cylindrical configuration throughout the above-discussed expansion and contraction of the shoes 12 between the expanded configuration and the contracted or collapsed configuration. Likewise, each of the rail portions 62 of the block-and-rail cam follower 60,62 is oriented with respect to one another such that each of the driven linkages 41 limits its corresponding shoe 12 to linear movement radially inwardly and outwardly, toward and away from the central axis of the transfer ring 10, throughout contraction and expansion of the shoes 12 between the expanded configuration and the collapsed configuration. It is understood that while single driven linkage sets 41 are illustrated in FIGS. 6A-C, in various example embodiments, such as that illustrated in FIG. 1, pairs of these driven linkage sets are provided side by side so as to be connected to both respective inner flat surfaces 18,22 of the first and second frame members 14,16, while also being connected to both respective sides of the circular drive member 30.

Various example embodiments of the present general inventive concept may provide a transfer ring to use in the manufacture of vehicle tires, the transfer ring including a circular frame, a plurality of driven linkages coupled to the circular frame and configured to be movable between a contracted position and an expanded position, a drive member disposed along the circular frame, the drive member being coupled to the driven linkages and configured to drive the driven linkages between the contracted position and the expanded position, and a plurality of shoes having arcuate interior surfaces facing substantially radially inwardly toward a central axis to collectively define a substantially cylindrical segmented gripping surface, each of the shoes being coupled to at least one of the driven linkages so as to be selectively move toward and away from the central axis, wherein each of the driven linkages includes a first member coupled to the circular frame, a second member coupled to the drive member and the first member, a third member coupled to a corresponding one of the shoes and to the first member, and a block-and-rail cam follower configured such that a rail portion is fixed to the circular frame, and a block portion is coupled to the third member, wherein the driven linkages are configured to limit movement of the arcuate surface to linear movement radially toward and away from the central axis. The first member may have a first end pivotably coupled to the circular frame, and a second end pivotably coupled to a portion of the third member. The second end of the first member may be pivotably coupled to third member proximate a central portion of the third member. The second member may have a first end pivotably coupled to the drive member, and a second end pivotably coupled to a portion of the first member. The second end of the second member may be pivotably coupled to the first member at a point closer to the second end of the first member than the first end of the first member. The third member may have a first end pivotably coupled to the block portion of the block-and-rail cam follower, and a second end pivotably coupled to the shoe. The transfer ring may further include a plurality of grooves formed in the circular frame to receive the respective rail portions of the bock-and-rail cam followers of each of the driven linkages. A pair of driven linkages may be provided for each of the respective shoes. Each pair of driven linkages may be configured to be respectively coupled to opposite inner surfaces of the circular frame. The drive member may be configured as a circular drive member disposed between the inner surfaces of the circular frame.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. A transfer ring to use in the manufacture of vehicle tires, the transfer ring comprising:
    a circular frame;
    a plurality of driven linkages coupled to the circular frame and configured to be movable between a contracted position and an expanded position, each of the driven linkages comprising:
        a first member coupled to the circular frame,
        a second member coupled to the first member, and
        a third member coupled to the first member;
    a drive member disposed along the circular frame, the drive member being coupled to each of the second members and configured to drive the driven linkages between the contracted position and the expanded position; and
    a plurality of shoes having arcuate interior surfaces facing substantially radially inwardly toward a central axis to collectively define a substantially cylindrical segmented gripping surface, each of the shoes being coupled to one of the third members so as to selectively move toward and away from the central axis; and
    a plurality of block-and-rail cam followers, each of the block-and-rail cam followers being coupled between the circular frame and one of the third members and configured such that a rail portion extends both radially and circumferentially along the circular frame to limit movement of the arcuate surface to linear movement radially toward and away from the central axis in relation to the circular frame.

2. The transfer ring of claim 1, wherein the first member has a first end pivotably coupled to the circular frame, and a second end pivotably coupled to a portion of the third member.

3. The transfer ring of claim 2, wherein the second end of the first member is pivotably coupled to the third member proximate a central portion of the third member.

4. The transfer ring of claim 1, wherein the second member has a first end pivotably coupled to the drive member, and a second end pivotably coupled to a portion of the first member.

5. The transfer ring of claim 4, wherein the second end of the second member is pivotably coupled to the first member at a point closer to a second end of the first member than a first end of the first member.

6. The transfer ring of claim 1, wherein the third member has a first end pivotably coupled to the block portion of the block-and-rail cam follower, and a second end pivotably coupled to the shoe.

7. The transfer ring of claim 1, further comprising a plurality of grooves formed in the circular frame to receive the respective rail portions of the block-and-rail cam followers of each of the driven linkages.

8. The transfer ring of claim 1, wherein a pair of driven linkages are provided for each of the respective shoes.

9. The transfer ring of claim 8, wherein each pair of driven linkages are configured to be respectively coupled to opposite inner surfaces of the circular frame.

10. The transfer ring of claim 9, wherein the drive member is configured as a circular drive member disposed between the inner surfaces of the circular frame.

11. A transfer ring to use in the manufacture of vehicle tires, the transfer ring comprising:
    a circular frame;
    a plurality of driven linkages coupled to the circular frame and configured to be movable between a contracted position and an expanded position, each of the driven linkages comprising:
        a first member coupled to the circular frame,
        a second member coupled to the first member, and
        a third member coupled to the first member;
    a drive member disposed along the circular frame, the drive member being coupled to each of the second members and configured to drive the driven linkages between the contracted position and the expanded position;
    a plurality of shoes having arcuate interior surfaces facing substantially radially inwardly toward a central axis to collectively define a substantially cylindrical segmented gripping surface, each of the shoes being coupled to one of the third members so as to selectively move toward and away from the central axis; and
    a plurality of cam followers, each of the cam followers coupled between the circular frame and one of the driven linkages to limit movement of the corresponding arcuate surface to linear movement radially toward and away from the central axis.

* * * * *